March 29, 1932.  H. G. LANE  1,851,190
ADJUSTABLE PLOW ATTACHMENT
Filed Aug. 5, 1930  2 Sheets-Sheet 1
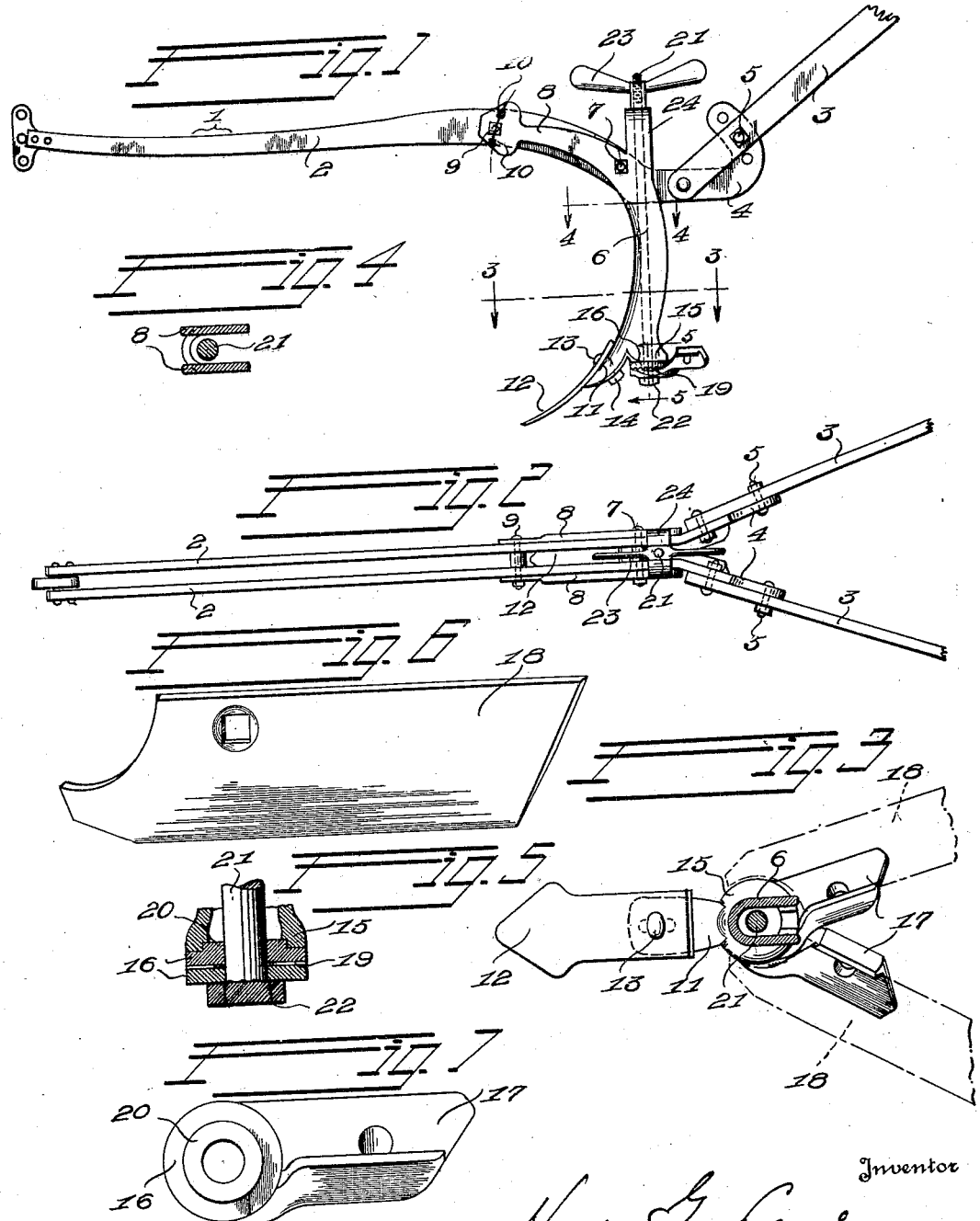

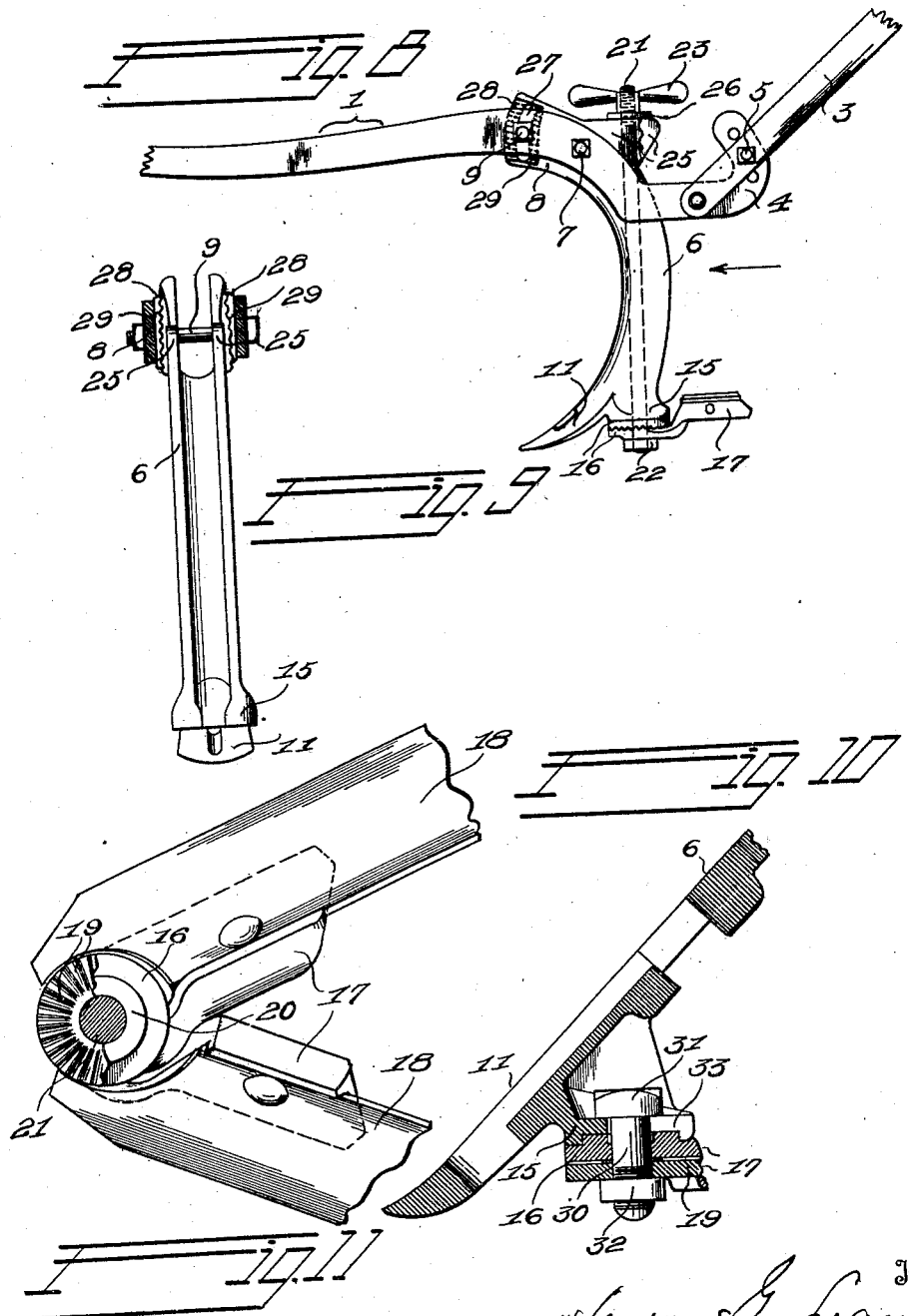

Patented Mar. 29, 1932

1,851,190

UNITED STATES PATENT OFFICE

HENRY GRADY LANE, OF BAINBRIDGE, GEORGIA

ADJUSTABLE PLOW ATTACHMENT

Application filed August 5, 1930. Serial No. 473,228.

My invention relates to plows, more particularly of the cultivator type. It has for its objects to provide an improved construction of the lower end of the stock for attachment of the plow-point or blade and attachment of plow sweeps or scrapers, and means for ready adjustment and clamping of the scrapers in position.

To the accomplishment of the foregoing and such other objects as may hereinafter appear the invention consists in the features hereinafter described and then sought to be clearly defined by the claims, reference being had to the accompanying drawings forming a part hereof and in which:

Figure 1 is a side elevation of one embodiment of the invention;

Figure 2 a top plan view of the same;

Figure 3 a cross section through the stock on the line 3—3 of Figure 1;

Figure 4 a cross section on line 4—4 of Figure 1;

Figure 5 a vertical section on line 5—5 of Figure 1;

Figure 6 a side view of one of the sweeps or scrapers, detached;

Figure 7 a plan view of one of the wings to which the sweeps are attached;

Figure 8 a side view of a modified form of stock and manner of attaching it to the beam;

Figure 9 a view of the modified stock, looking at the rear;

Figure 10 a modified form of attaching the sweep supporting wings to the stock;

Figure 11 a plan view showing the disposition of the wings to which the sweeps are attached.

In the drawings the numeral 1 designates a plow beam which may be of any suitable, approved type, but as illustrated, made up of two parallel spaced apart bars 2 to the rear of which handles 3 are connected, in any suitable manner, as illustrated to rear extensions 4 of the parallel bars by bolts 5 so as to be adjusted to the desired elevation and inclination. The plow stock 6 is made tubular or hollow and connected to the beam by a pivot bolt 7 and has forwardly extending arms 8 connected by a bolt 9 to the beam, the ends of the arms being formed with a series of openings 10 to receive the bolt 9 in the various adjustments that may be made between the stock and beam. The lower end of the stock is projected forward to form a seat 11 for the plow point or blade 12 which will be held thereto by a bolt or bolts 13 (one or more) passed through registering openings or slots in the plow point or blade and its seat and secured by a nut 14 screwed onto the threaded end of the bolt, or otherwise. The lower end of the stock 6 is formed with an enlargement or boss 15 to form a seat for a rotatable disk 16 which has a wing 17 extending at an angle therefrom as illustrated and to which will be bolted or otherwise attached a sweep or scraper blade 18. A second disk 16, likewise having a wing 17 formed integral therewith for supporting a sweep or scraper blade 18, is rotatably mounted beneath the first named disk 16. The two disks 16 have opposed serrated faces comprising teeth 19 so as to prevent one disk from rotating relatively to the other when assembled and clamped together. The upper disk is preferably formed with a boss or equivalent raised portion 20 which may have an angular outline, or otherwise, to fit in the recessed boss 15 of the stock to assist in securing the disk in place. The disks are clamped one to the other by suitable means, for instance by a bolt, so as to lock one wing in lateral adjusted relation to the other in various angular adjustments of the sweeps or scrapers 18 for the particular work desired. This clamping bolt, designated by the numeral 21, passes through the two disks, and is illustrated as passing up through the tubular or hollow stock 6. The lower end of the bolt is provided with a head 22, in the form of a nut, or otherwise, to bear against the outer face of the lower disk, and its upper end provided with a wing nut 23, so that by screwing up the nut, the two disks will be drawn together and clamped so as to hold the wings in their adjusted positions. By extending the bolt up through the stock and having the nut at its upper end it is more accessible and the operation is easier in manipulating the parts to loosen the connection between the two disks to permit one to be adjusted relatively to the other to vary the set of the sweeps or scrapers. In Figure 1 of the drawings the upper end of the stock is shown as formed with a yoke 24 which forms a seat or bearing for the wing nut 23 in operating the clamping bolt. In Figure 8 of the drawings oppositely disposed ears 25 projecting from the upper part of the stock are employed for affording a seat for the wing adjusting nut, and a washer plate 26 may span and rest upon the ears as a bearing for the nut. The operation of the parts mentioned is substantially the same as illustrated in Figure 1 of the drawings. In Figure 8 of the drawings, the forwardly extending arms 8 of the hollow stock 6 instead of having perforations 10 in their ends for adjustment of the beam and stock in relation to each other, is formed with arcuate slots 27 for passage of bolt 9, and serrations or teeth 28 may be formed along the slots with which will engage teeth of washer plates 29, so that when an adjustment has been made and the nut of bolt 9 tightened, the parts will be clamped in holding positions. In Figure 1 the stock arms 8 are shown as positioned outside of the parallel bars 2 forming the plow beam, and in Figure 8 they are shown as lying between the bars of the beam but any other suitable disposition of the parts may be used. Nor is the invention limited to any particular form or construction of plow beam as the novel features may be employed regardless of the type of plow beam employed, and this is true whatever manner of attaching the plow handles is employed.

In Figure 10 of the drawings a different form of plow stock is shown, but the lower face of the stock is formed with a boss corresponding substantially to the boss 15 of the form of stock shown in the other figures of the drawings and being below the seat 11 for the plow point. In the form of Fig. 10 the disk 16 of one of the wings 17 fits in the recess of the boss, and the meeting faces of the two disks 16 are formed with serrations 19. The clamping bolt 30 passes through the two disks 16 and its head 31 lies within the boss as illustrated and its threaded end is provided with nut 32 for tightening and clamping the parts in position. In this form the boss 15 is formed with a laterally disposed slot 33 for easy positioning of the bolt in assembling the parts. While this form possesses some of the structural features in the forms of Figs. 1 and 2, it is without the advantages resulting from having the clamping bolt extending from the boss at the base of the stock up to the top of the stock for manipulation as in the other forms.

It is obvious from the foregoing description that the invention is not limited to particular features of construction except as the same may be defined in the appended claims.

Having described my invention and set forth its merits what I claim is:

1. In combination with a plow stock formed with a boss on its under side, at its lower end, of wings formed at one end with disks fitting one upon the other, one disk being seated against the end of said boss, a bolt passed through the disks and projecting from the lower end of the stock for locking together the stock and wings, and sweep or scraper blades secured to said wings.

2. In combination with a plow stock formed with a boss on its under side, at its lower end, of wings formed at one end with disks having intermeshing toothed faces fitting one upon the other, one disk being seated against the end of said boss, a bolt passed through the disks and boss at the lower end of the stock for locking together the stock and wings, and sweep or scraper blades secured to said wings.

3. In combination with a plow stock formed with a boss on its under side, at its lower end, of radially adjustable wings lapping one upon the other, with one of them seated on said boss, means consisting of a bolt passing through said boss and the wings for adjustably securing the wings to the lower end of the stock, and sweep or scraper blades attached to the wings.

4. In combination with a plow stock, of superimposed disks rotatably mounted at the lower end of the stock and each provided with a wing for attachment of a sweep or scraper blade, a bolt connected with the disks and extending substantially the length of the stock, and means positioned adjacent the upper end of the stock and associated with the bolt for clamping the wings to the lower end of the stock.

5. In combination with a plow stock formed with a boss at its lower end, of superimposed disks rotatably mounted beneath the boss of the stock and each provided with a wing for attachment of a sweep or scraper blade, a bolt extending substantially the length of the stock and connected at its lower end with said disks, and means applied to the upper end of the bolt for clamping the wings to the under side of the stock boss.

6. In combination with a plow stock of substantially tubular or hollow formation, of superimposed disks rotatably mounted against the lower end of the stock and each provided with a wing for attachment of a sweep or scraper blade, a bolt passing through the stock and connected at its lower end with said disks, and means connected with the upper end of the bolt for clamping the wings to the lower end of the stock.

7. In combination with a plow stock formed with a boss at its lower end, of superimposed disks rotatably mounted beneath the boss and each having a wing for attachment of a sweep or scraper blade, one of said disks having a portion fitting in a recess formed in the stock boss, and means for clamping the wings in adjusted positions to the stock boss.

In testimony whereof I affix my signature.

HENRY GRADY LANE.